United States Patent
Beghtol et al.

(10) Patent No.: US 6,253,075 B1
(45) Date of Patent: Jun. 26, 2001

(54) METHOD AND APPARATUS FOR INCOMING CALL REJECTION

(75) Inventors: Justin Beghtol; Kenneth Mar, both of San Diego, CA (US)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/212,757

(22) Filed: Dec. 16, 1998

Related U.S. Application Data (60) Provisional application No. 60/086,032, filed on May 19, 1998.

(51) Int. Cl.[7] .................................... H04M 3/42
(52) U.S. Cl. .................... 455/415; 455/412; 455/567; 379/142
(58) Field of Search ................... 455/404, 33.1, 455/54.1, 90, 525, 550, 422, 567, 455–458, 412–415, 565; 579/142, 127, 67–69, 201, 207, 211, 373, 372, 374, 376, 350, 140, 199–200

(56) References Cited

U.S. PATENT DOCUMENTS

| | | | |
|---|---|---|---|
| 5,329,578 | * 7/1994 | Brennan et al. | 379/67 |
| 5,553,125 | 9/1996 | Martensson | 379/140 |
| 5,559,860 | 9/1996 | Mizikovsky | 379/58 |
| 5,657,372 | 8/1997 | Ahlberg et al. | 455/414 |
| 5,661,788 | 8/1997 | Chin | 379/142 |
| 5,748,709 | * 5/1998 | Sheerin | 379/67 |
| 5,758,280 | * 5/1998 | Kimura | 455/412 |
| 5,835,582 | * 11/1998 | Matsuda et al. | 379/373 |
| 5,930,351 | * 7/1999 | Lappen et al. | 379/373 |
| 5,956,632 | * 9/1999 | Shon | 455/404 |
| 6,044,148 | * 3/2000 | Bleile | 379/375 |
| 6,108,630 | * 8/2000 | Kuechler et al. | 704/270 |
| 6,122,347 | * 9/2000 | Borland | 379/70 |

FOREIGN PATENT DOCUMENTS 4-258029 * 9/1992 (JP) ............... H04B/7/26

* cited by examiner

*Primary Examiner*—Daniel Hunter
*Assistant Examiner*—Pablo Tran
(74) *Attorney, Agent, or Firm*—Brian T. Rivers (57) ABSTRACT

A method and apparatus for rejecting incoming calls for use in a mobile communications device. The method and apparatus permit a user of a mobile communications device to automatically reject calls intended to be received by the device. In an exemplary embodiment, a rejection memory within the mobile device is preprogrammed with identification information representative of transmitting stations to be rejected. When a call is incoming, identification information included with the incoming call is compared with identification information contained in the rejection memory. When a match is detected, a rejection message is automatically sent by the mobile communications device to the transmitting station. Upon receipt of the rejection message, the transmitting station terminates the call and may reroute the call to a voice messaging system. Additionally, upon display of the identification information of an incoming call, the user may manually trigger the transmission of the rejection message from the mobile communications device.

15 Claims, 4 Drawing Sheets

FIG. 1

| MESSAGE TYPE | FEATURE DESCRIPTION | RECORD TYPE (BINARY) |
|---|---|---|
| FLASH WITH INFORMATION MESSAGE | FEATURE INDICATOR | 00000010 |

FIG. 3a

| TYPE SPECIFIC FIELD | FEATURE IDENTIFIERS (BITS) |
|---|---|
| INCOMING CALL REJECTION | 0000 |
| RESERVED | XXXX |

METHOD AND APPARATUS FOR INCOMING CALL REJECTION

CLAIM OF PRIORITY FROM A COPENDING PROVISIONAL PATENT APPLICATION

Priority is herewith claimed under 35 U.S.C. §119(e) from copending Provisional Patent Application 60/086,032, filed May 19, 1998, entitled "Incoming Call Rejection," by Justin Beghtol and Kenneth Mar. The disclosure of this Provisional Patent Application is incorporated by reference herein in its entirety.

FIELD OF INVENTION

The present invention relates generally to call processing techniques in cellular telecommunications systems. More particularly, the present invention relates to apparatus, and associated method, for rejecting incoming calls to a mobile communications device within a cellular telecommunications system.

BACKGROUND OF THE INVENTION

Wireless telecommunications systems provide a convenient way for users to communicate when landline phones are unavailable. What was once an expensive luxury is now an affordable convenience. By simply carrying a small, lightweight mobile communications device, users may place or receive calls of excellent quality in any geographic region offering such wireless service.

Typically, wireless telecommunications systems are made up of a series of base stations connected to landline telecommunications networks through the use of base station controllers. The base stations have the capacity to communicate with each other via the base station controllers and to establish a fixed number of radio frequency (RF) communications channels with remote mobile phones. The RF communications channels act as a conduit by which the mobile phones may ultimately communicate with landline phones. Thus, as long as a mobile user remains within the geographic coverage area of the wireless system, communication with other mobile and landline users is possible.

To standardize the operation of wireless systems, several communication implementations have been developed. One such implementation, currently used in numerous wireless communication system deployments, is known as Code Division Multiple Access (CDMA). This communication technique is described under the TIA/EIA/IS-95-A standard (IS-95). Accordingly, the IS-95 standard is incorporated by reference in its entirety so as to provide the reader with adequate background information regarding mobile phone operation in an IS-95 telecommunications environment. As defined in the IS-95 standard, analog voice signals are converted to the digital domain, orthogonally encoded and then spread by a pseudo-random spreading signal so as to occupy a 1.23 MHz frequency band. From this spread signal, inphase and quadrature phase signals are generated which are then combined and modulated onto RF carrier signals for transmission between remote mobile stations and fixed base stations.

Current wireless systems allow landline users to place and receive calls with mobile phone users. Additionally, mobile phone users can place and receive calls with other mobile phone users. Fixed base stations facilitate these calls by routing the calls between users and handling necessary overhead activities required to establish the RF communications channels used to conduct the calls.

Typically, when a landline user calls a mobile phone user, the base station acts as an intermediary by alerting the mobile of the attempted call via at least one RF channel. After alerting the mobile, the base station waits for a fixed time period, which defines a ringing cycle, to receive a response from the mobile. The response indicates the mobile is ready to accept the call. If the mobile does not respond within the ringing cycle time period, the base station releases the call by terminating the call alert to the mobile and signaling to the caller that the mobile is unavailable. During the ringing cycle, the mobile phone produces an audible ringing or mechanical vibration to alert the mobile phone user of the incoming call. If the mobile phone user decides to answer the incoming call, a response is sent from the mobile to the base station indicating that the call is to be accepted. The base station then sets up a connection on the existing RF channel or establishes a second RF channel where the call will ultimately be connected.

Included in the call alert to the mobile phone may be identification information about the caller, sometimes referred to as caller ID. This identification information can be displayed by the mobile phone allowing the mobile phone user to determine who is calling before the call is answered. If the mobile phone user decides not to receive calls from specific callers, the identification information can be viewed, and if desired, the incoming call can be left unanswered for the entire ringing cycle.

One of the major benefits to users of mobile phones is the ability to place or receive calls without being restricted to a fixed location as when using a landline phone. So long as the mobile phone maintains an RF communication channel with at least one base station, communication services are generally available. This allows mobile users to send and receive calls when away from their home or office and even while traveling in automobiles.

However, having accessibility to instant communications may at times have undesirable consequences. In particular, unless the mobile phone is powered off, there may be no action a user may take to prevent the phone from proceeding through the entire ringing cycle. This means that for every unanswered incoming call, the phone will ring for the entire ringing cycle until the call is released by the base station. Even if the user is able to mute the audible ringing, the call is still processed by the phone until released, which may prevent the phone from handling other calls. There may also be times when a user desires to refuse all communications from certain callers. Such times may occur when prank callers or telemarketers repeatedly call or when users simply do not want to receive calls originating from specific calling stations. Unfortunately, present systems do not allow mobile phones to refuse to accept calls nor do they provide mobile phone users with a rejection-on-demand capability to immediately reject any incoming call as desired.

Mobile phone systems have also adopted some of the features available in landline systems. For instance, a call-waiting feature may be implemented in a mobile phone system. During operation of call waiting, a user of a mobile phone may be connected and in active communication with a first caller when a second caller attempts a call to the same mobile phone. Instead of the second caller getting an immediate busy signal, a ringing cycle occurs where the mobile phone user receives a call alert indicating that there is an incoming call. The mobile phone user may then switch over to the second call and put the first call on hold, or may ignore the second call and continue on the first call. If the second call is not answered, the call alert to the mobile phone user will continue for a time period defining the ringing cycle.

Unless the mobile phone user answers the second call, there is currently no way to terminate the call alert until the ringing cycle is complete.

There currently exists a need in the mobile communications industry for a method and apparatus wherein a user of a mobile phone has the capability to reject an incoming call. Such a method and apparatus should provide the user an automatic mode of rejection and a manual mode of rejection. The automatic mode should allow the user to preprogram the mobile phone with information descriptive of calling stations whose calls are to be rejected. When an incoming call from a pre-selected calling station is detected, the mobile phone should automatically reject the call. The preprogrammed information should include wild card characters, thereby allowing entire groups of calling stations to be rejected from a single entry. In the manual mode of operation, the method and apparatus should allow a user to manually reject any incoming call as desired. Thus, the user can conveniently and effectively screen incoming calls, prevent undesirable audible ringing and minimize unnecessary utilization of the phone.

OBJECTS OF THE INVENTION

It is, therefore, an object of this invention to provide a method and apparatus for use in a mobile communications device that overcomes the foregoing and other problems.

Another object and advantage of this invention is to provide a method and apparatus allowing mobile phone users to selectively reject incoming calls, wherein the determination process is done at the mobile phone.

It is a further object and advantage of this invention to provide a method and apparatus for automatically rejecting an incoming call.

It is a further object and advantage of this invention to provide a method and apparatus for automatically rejecting incoming calls by utilizing wildcard characters to reject all calls having common identification information.

It is a further object and advantage of this invention to provide a method and apparatus for use in a mobile communications device for allowing a user manually to reject an incoming call.

It is a further object and advantage of this invention to provide a method and apparatus to allow a second call to be rejected, either manually or automatically, while the user is actively involved in a first call.

BRIEF SUMMARY OF THE INVENTION

The present invention provides a method and apparatus for rejecting calls to a mobile communications device. Incoming calls received by the mobile device may contain information that is descriptive of the origin of the call. Based on the descriptive information, automatic rejection can occur. Additionally, a manual rejection feature is provided to allow the user to reject any call as desired.

In an embodiment of the invention, the mobile phone comprises an input actuator, a rejection memory and a message processor. The rejection memory contains information descriptive of calling stations whose calls are to be rejected. In the automatic mode, identification information associated with an incoming call is compared with identification information stored in the rejection memory. A determination is made, and if the incoming call is to be rejected, the message processor automatically transmits a rejection message from the mobile station to the base station. In the manual mode, upon receipt of an incoming call, the user may immediately actuate the input actuator. This causes the message processor to immediately transmit the rejection message to the base station. Once the base station receives the rejection message, the call is released by the base station and the caller is notified of the unavailability of the mobile. The method and apparatus is especially suited to provide convenience to the mobile user by allowing unwanted calls to be easily rejected.

In these and other aspects, therefore, a method of selectably rejecting an incoming call to a mobile phone is provided. The mobile phone has a transceiver circuit for transmitting and receiving transmissions with a remote transceiver. An incoming transmission is selectively rejected in a process beginning when the incoming transmission from the remote transceiver is received by the mobile phone. A determination is made at the mobile phone whether the incoming transmission is to be rejected. If it is determined that the incoming transmission is to be rejected, a rejection message is transmitted to the remote transceiver, wherein the rejection message indicates to the remote transceiver that the incoming transmission is to be rejected.

BRIEF DESCRIPTION OF THE DRAWINGS

The above set forth and other features of the invention are made more apparent in the ensuing Detailed Description of the Invention when read in conjunction with the attached drawings, wherein like reference numerals refer to like parts and in which.

DETAILED DESCRIPTION OF A PREFERRED EMBODIMENT

Figure 1:
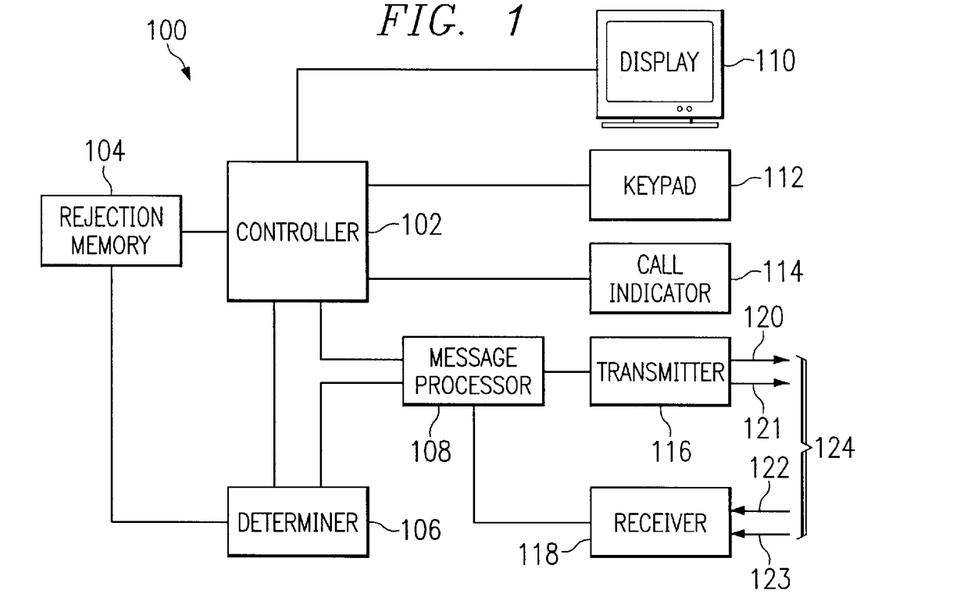
FIG. 1 depicts an apparatus constructed according to the teachings of the present invention.

Referring to FIG. 1, therein is depicted apparatus 100 for rejecting an incoming call according to an embodiment of the invention. Apparatus 100 comprises controller 102, rejection memory 104, determiner 106, message processor 108, display 110, keypad 112, call indicator 114, transmitter 116 and receiver 118. Transmitter 116 and receiver 118 are used to communicate with a base station over communication channel 124. Transmitter 116 is capable of transmitting information from the mobile phone to the base station over access channel 120 and reverse traffic channel 121. Receiver 118 is capable of receiving information transmitted from the base station to the mobile station over paging channel 122 and forward traffic channel 123. The combination of channels 120, 121, 122 and 123 comprise communication channel 124.

In a telecommunications system operating according to the TIA/EIA/IS-95-A standard, when a remote mobile station is powered on, a registration process occurs. The registration process comprises a series of messages sent between the base station and the remote mobile station over communication channel 124. Registration allows the mobile station to obtain system parameters from the base station regarding operation of the telecommunications system. Registration also allows the base station to determine which mobile stations are operating in the base station's geographic area. After the registration process is complete, the mobile station may enter a standby mode where it waits to process incoming and outgoing calls. The registration process is well known to those skilled in the art and is not relevant to the disclosed embodiment of the present invention. Therefore, the registration messaging sequence will not be discussed in detail. However, the reader may refer to the IS-95 standard for a complete description.

Referring again to FIG. 1, rejection memory 104 is used to store information identifying callers whose calls are to be automatically rejected. The information in rejection memory 104 may reference individual callers, lists of callers or contain "wild card" characters referencing entire groups of callers. Partial entries may also be used wherein, for example, a few numbers are used, such as 234, to reject all calls from originating stations having at least the numbers 234 included in their complete numbers. Stored information may also contain alphanumeric characters, such as the name of the calling party or other information used to identify the calling party or calling station. This capability allows the invention to operate more efficiently as more caller identification information becomes available for use. Information may be entered into the rejection memory through user inputs, such as inputs entered on a keypad 112. These inputs may be received by controller 102 and then input into rejection memory 104. Additionally, a computer interface such as a hardwired connection or an infrared (IR) link may be used to enter information into rejection memory 104. Information may also be downloaded to the mobile station from a network such as a wireless telecommunications network for entry into rejection memory 104. In this method of entry, rejection information is received at receiver 118, passed to message processor 108, sent to controller 102 and then entered into rejection memory 104.

Figure 2:
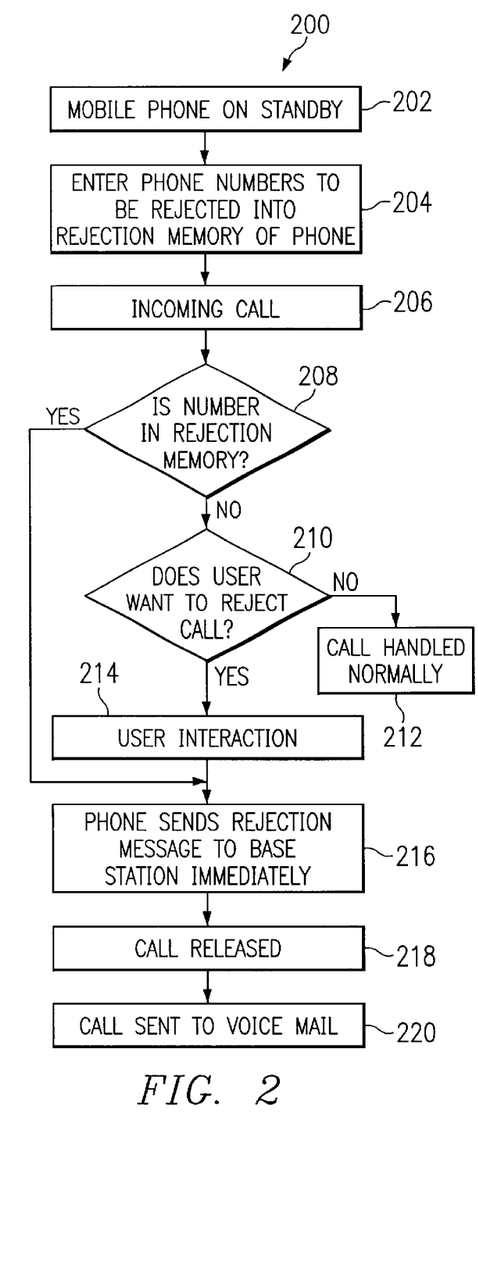
FIG. 2 depicts a flow diagram representing call processing according to the teachings of the present invention.

Referring now to FIG. 2, therein is depicted a call processing flow diagram 200 according to an embodiment of the present invention. Call flow diagram 200 illustrates how a call to a mobile station may be automatically or manually rejected. In the embodiment, the mobile station begins in the standby mode at block 202 where it waits to process calls. Entering the standby mode may occur, for example, after completion of the registration process described above. When in the standby mode, the user can enter information descriptive of calls to be automatically rejected into the rejection memory 104 as shown at block 204. The user can accomplish this through the use of keypad 112, wherein controller 102 receives user input from keypad 112 and stores the information into rejection memory 104.

After rejection information has been placed in the rejection memory, an indication of an incoming call may be received as shown at block 206. The incoming call indication is received at receiver 118 via communication channel 124. The incoming call indication may contain information about the origin of the call, such as the caller ID information described above. At block 208 a determination is made whether or not to automatically reject the incoming call. The determination can be made when the information about the incoming call received at receiver 118 is sent to determiner 106 via message processor 108. In addition, information about calls to be rejected is received at determiner 106 from rejection memory 104. Determiner 106 then determines if the call is to be rejected by utilizing one or more of the comparison techniques described above. If it is determined that the call is to be rejected, a rejection message is transmitted as shown at block 216 when determiner 106 informs message processor 108 to generate a rejection message and send it to transmitter 116 for transmission to the base station. After receiving the rejection message, the base station releases the call from the mobile as shown at block 218. The release occurs when the base station sends a release message to the mobile phone over communication channel 124. Receiver 118 receives the release message and transfers it to message processor 108 and further to controller 102. After controller 102 receives the release message, it responds by re-initializing the call process to return to block 202 where the phone enters the standby mode again. In the meantime, the base station may terminate the incoming call or transfer the call to a voice messaging system as shown at block 220.

If a determination is made at block 208 that the call is not to be automatically rejected, a call alert is activated and the user is given the opportunity to manually reject the call at block 210. The call alert occurs when controller 102 displays the incoming call identification information on display 110 and activates the call indicator 114. Call indicator 114 is capable of generating rings, tones or other audible sounds, as well as mechanical vibration or other physical indications detectable by the mobile phone user. If the user decides to manually reject the call, the user indicates this to the phone by, for example, pressing a button on keypad 112, or some other available input actuator, thereby providing a user interaction as shown at block 214. A user interaction at keypad 112 is received at controller 102 which in turn directs message processor 108 to send the rejection message to transmitter 116 for transmission to the base station. As before, when the base station receives the rejection message, the call will be released.

If the user does not want to manually reject the call at block 210, the call is processed normally as shown at block 212. This means the user has the option to answer the call or let it continue to ring. The user may answer the call by entering a user input on keypad 112, for example. If the user does not answer after a fixed period of time, for example, a ringing cycle, a time out will occur and the base station will release the call.

Figure 3A:
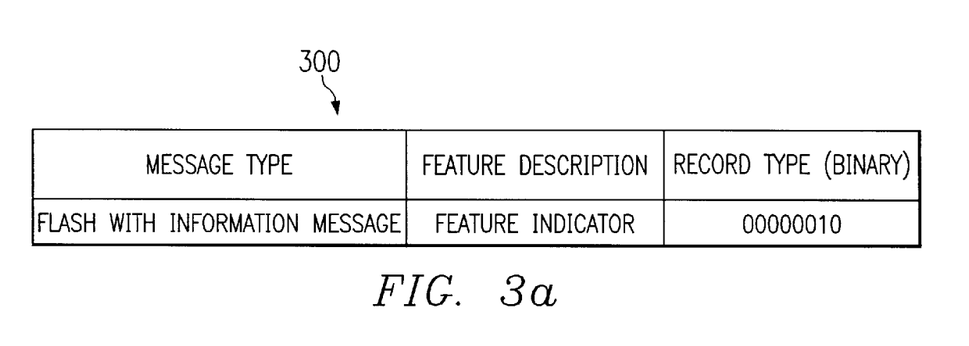
FIG. 3a depicts a message as defined under the IS-95 standard known as Flash with Information Message.
Figure 3B:
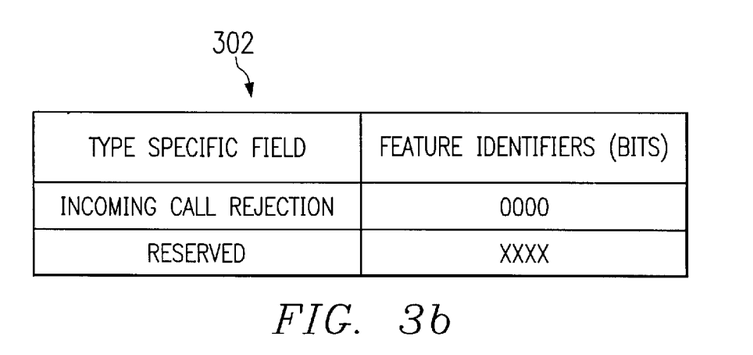
FIG. 3b depicts a Rejection Message for use according to the teachings of the present invention.

The rejection message is used to notify the base station that the mobile phone user would like to immediately reject the attempted incoming call. In a cellular system operating according to the IS-95 standard, a rejection message could be incorporated under IS-95 section 6.7.4, Reverse Traffic Channel Information Records. On the reverse traffic channel, information records may be included in a Flash with Information Message. FIG. 3a depicts an information record type 300 known as a Feature Indicator, which could be used to provide the rejection message in a Flash with Information Message. Under the IS-95 standard, section 6.7.4.1 defines a Feature Indicator message. Referring to FIG. 3b, therein is depicted message format 302 for the Feature Indicator, which can be used to indicate a rejection message to the base station. In this format, the first four bits may be used to signify call rejection by setting them to the value of "0000." The next four bits are reserved. The rejection message indicates to the base station that the mobile phone user desires to have the attempted incoming call immediately rejected. This is different from merely indicating to the base station that the mobile phone cannot receive the call because it is busy. By transmitting a rejection message to the base station, the base station can distinguish between a busy message and a rejection message and thereby process the call as appropriate for each situation. For instance, if the mobile phone indicates it is busy, the caller may hear a message indicating this and be given an opportunity to leave a voice message. If the mobile phone indicates that the call is to be rejected as an undesired call, for example, the caller may be given no opportunity to leave a message and the call may be immediately terminated.

Figure 4:
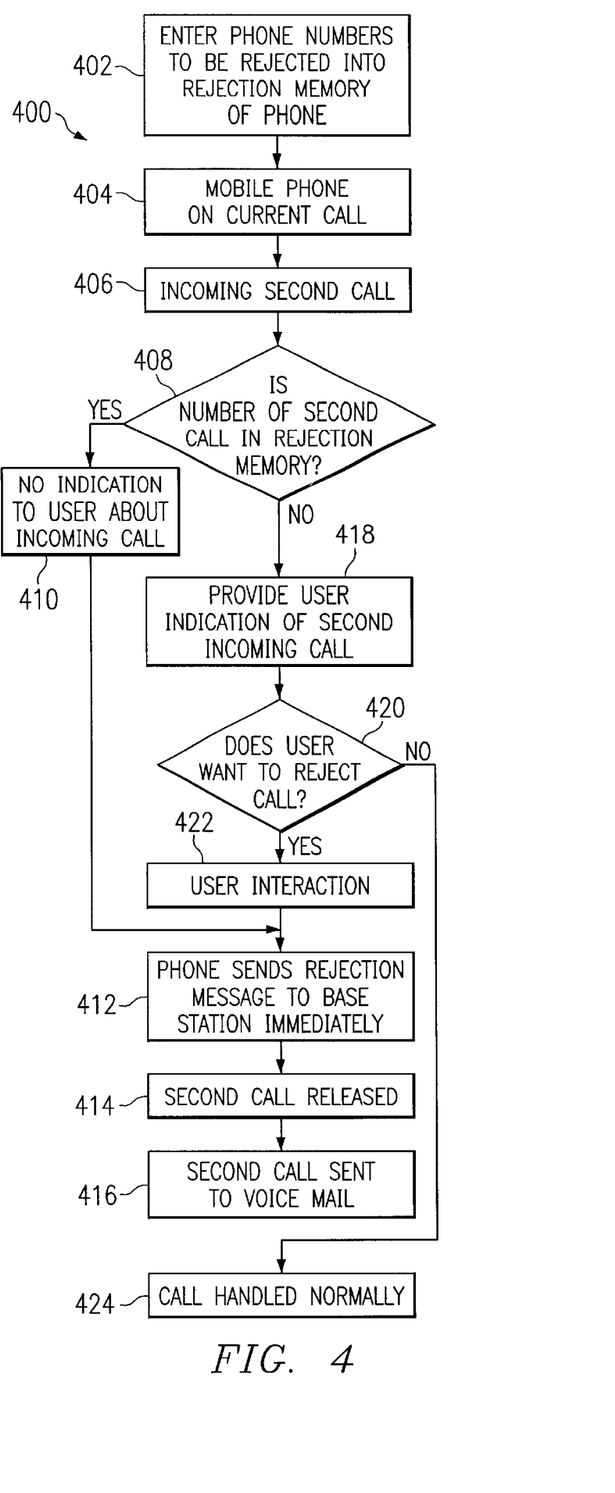
FIG. 4 depicts a flow diagram representing call processing of an incoming call according to the teachings of the present invention, wherein the mobile communications device is currently processing an active call.

Referring to FIG. 4, another embodiment of the invention is depicted by call processing flow graph 400. In this embodiment, the mobile phone user is connected to a current call when the incoming call is attempted. Block 402 functions identically to block 202 of FIG. 2. At block 404, the mobile phone user is connected to a current call. The current call may become active when the phone goes through the stages of call process 200 to reach block 212. At block 212 the user decides to accept the incoming call which is then connected. While processing the connected call, an indication of an incoming call arrives as shown at block 406. The incoming call indication is received at receiver 118 via communication channel 124. The incoming call indication may contain identification information about the origin of the call, such as the caller ID information described above. At block 408 a determination in made whether or not to automatically reject the incoming call. The determination can be made when the information about the incoming call received at receiver 118 is sent to determiner 106 via message processor 108. In addition, information about calls to be rejected is received at determiner 106 from rejection memory 104. Determiner 106 then determines if the call is to be rejected by utilizing one or more of the comparison techniques described above. If a determination is made to reject the incoming call, no indication of the incoming call is given to the user as shown at block 410. Therefore, the user who is on the current call is undisturbed by the attempted incoming call. The mobile phone then automatically sends the rejection message to the base station as shown at block 412. Determiner 106 informs message processor 108 to generate a rejection message and send it to transmitter 116 for transmission to the base station. Alternatively, a user notification may be provided, via call indicator 114, indicating to the user an incoming call was attempted and automatically rejected. In response to receiving the rejection message, the base station releases the incoming call from the mobile phone as shown at block 414, and then the call may be transferred to voice mail as shown at block 416 or simply terminated if desired.

If a determination is made not to reject the incoming call at block 408, the user is then provided an indication of the incoming call at block 418. This indication may be a short beeping in the phone earpiece or other indication, such as a muted ring, to notify the user of the incoming call. The user may still decide to manually reject the incoming call at block 420, by providing some input to the phone at block 422. If this is done, the phone sends out the rejection message as shown at block 412. The base station then releases the call from the mobile phone as shown at block 414 and then may transfer the call to voice mail as shown at block 416.

If the user does not want to manually reject the call at block 420, the call can be accepted as shown at block 424. In this case the currently connected call may be placed in a hold state while the incoming call is connected. The user then has the option to switch between calls or to terminate one call and continue the other.

Figure 5:
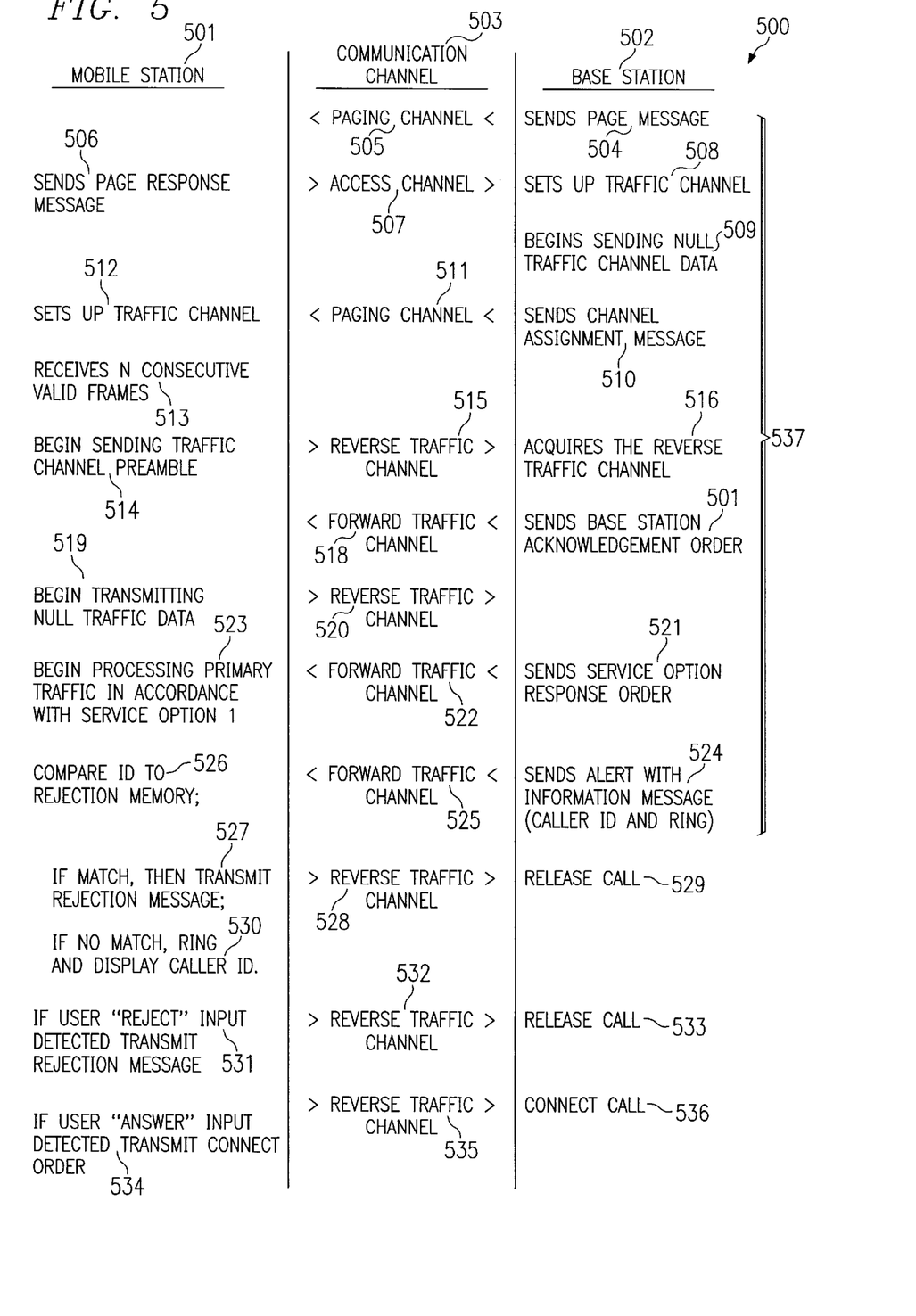
FIG. 5 depicts an exemplary message sequence for rejecting a call according to the teachings of the present invention.

Referring now to FIG. 5, therein is depicted messaging sequence 500 which can be used to implement an embodiment of the present invention as depicted in FIG. 2. Messaging sequence 500 can be used in a telecommunications system operating in accordance with the IS-95 standard. It will be apparent to those skilled in the art that by substituting the corresponding protocol and processes, the disclosed call rejection invention may be similarly implemented using different message sequencing as found in other types of communications networks.

In the embodiment of FIG. 2, functional blocks 206, 208, 210, 212, 214, 216, 218 and 220 require messages to be transmitted between the mobile phone and the base station to fulfill the specified tasks. These messages are sent via communication channel 124. The following description, which references FIGS. 2 and 5, defines the types of messages that are sent, where they originate and what portion of communication channel 124 they are transmitted on.

Referring again to FIG. 5, mobile station activities are shown at 501 and base station activities are shown at 502. The portion of communication channel 124 used for transmitting messages is shown at 503.

Incoming Call (Block 206)

When a calling party attempts to call the mobile phone, an indication of the incoming call is received by the mobile phone as shown at block 206. This indication is accomplished through a series of messages indicated at 537 between the base station and the mobile phone as can be seen in FIG. 5. The base station acts as a conduit by which calls are routed to the mobile phone. When the base station receives a call whose intended destination is the remote mobile phone, a page message 504 is sent to the mobile phone via paging channel 122 as shown at 505. The page message alerts the mobile that a calling party is attempting a call to the mobile phone user. Upon receipt of the page message 504, the mobile responds by transmitting a page response message 506 over the access channel 120 as shown at 507. The page response message tells the base station that the mobile is available to receive the call. After the page response message 506 is received, the base station sets up a forward traffic channel 123 as shown at 508 where the call may be connected. The base station starts transmitting null data 509 on the newly established channel and then transmits a channel assignment message 510 over the paging channel 122 as shown at 511 to inform the mobile station about the assigned traffic channels where the call may be connected.

Once the mobile receives the channel assignment message 510, it sets up transmitter 116 and receiver 118 to use the assigned traffic channels as shown at 512 and prepares to communicate over the assigned channel by receiving a number (N) of consecutive valid information frames over the assigned forward traffic channel 123 as shown at 513. The number of frames (N) is an operating parameter determined by the telecommunications system. Afterwards, the mobile begins sending a traffic channel preamble 514 to the base station over the assigned reverse traffic channel 121 as shown at 515. The base station acquires the traffic channel preamble 516 and transmits an acknowledgment order 517 over the forward traffic channel 123 as shown at 518. When the mobile receives the acknowledgment order 517, it begins transmitting null traffic data 519 over the reverse traffic channel 121 as shown at 520. The base station continues the call setup process by sending a service option response order 521 over the forward traffic channel 123 as shown at 522. The service option response order is another operating parameter determined by the telecommunications system. The mobile station responds by processing the primary traffic channel in accordance with the service option selected at 523.

Once a traffic channel is established, the base station provides the mobile phone user information about the incoming call by sending an Alert with Information Message 524 over the forward traffic channel 123 as shown at 525. This message may contain caller ID information as described above and can be used by the mobile phone as an indication of an incoming call wherein the mobile phone may begin a ringing cycle if desired.

Phone Sends Rejection Message (Blocks 208, 216 and 220)

Upon receipt by the mobile phone of the Alert with Information Message 524, the mobile phone may not automatically start a ringing cycle. First, the mobile phone may determine if the incoming call should be automatically rejected. The determination occurs when the mobile phone compares the caller ID information contained in the Information Message 524 to information stored in rejection memory 104 as shown at 526. If a match is detected, the mobile phone transmits a rejection message 527 to the base station over the reverse traffic channel 121 as shown at 528. The rejection message can be formatted as shown in FIGS. 3a and 3b, thereby indicating to the base station that the attempted call is to be rejected. Upon receipt of the rejection message, the base station releases the call as shown at 529 and may transfer the caller to a voice messaging system as shown at block 220. If no match of the identification information is detected as shown at 530, the mobile phone may begin a ringing cycle to alert the mobile phone user of the incoming call by activating call indicator 114. During this time the caller ID information may also be displayed on mobile phone display 110.

Manual Rejection of the Incoming Call (Blocks 210 and 214)

Once the user is alerted to the incoming call, indicating that automatic rejection did not occur, the incoming call can still be rejected if the user provides a manual rejection input as shown at blocks 210 and 214. The messaging sequence for manual rejection is shown in FIG. 5. When the manual rejection input from the user is detected, the mobile phone transmits the rejection message 531 over the reverse traffic channel 121 as shown at 532. When the message is received by the base station, the call will be released as shown at 533.

Connecting the Call (Block 212)

If the call is not automatically or manually rejected, it may be answered or, if desired, ignored. If the user wishes to answer the call, the user may provide an input to the mobile phone indicating that the call is to be answered. This action is shown at block 212 and results in the transmission by the phone of a connect message as shown at 534. A connect order 534 is transmitted to the base station over the reverse traffic channel 121 as shown at 535. When the base station receives this message, the incoming call is connected as shown at 536 to allow communication between the calling party and the mobile phone user. The process of connecting the call allows two-way communication between the mobile phone user and the calling party by utilizing the forward traffic channel 123 and the reverse traffic channel 121.

Figure 6:
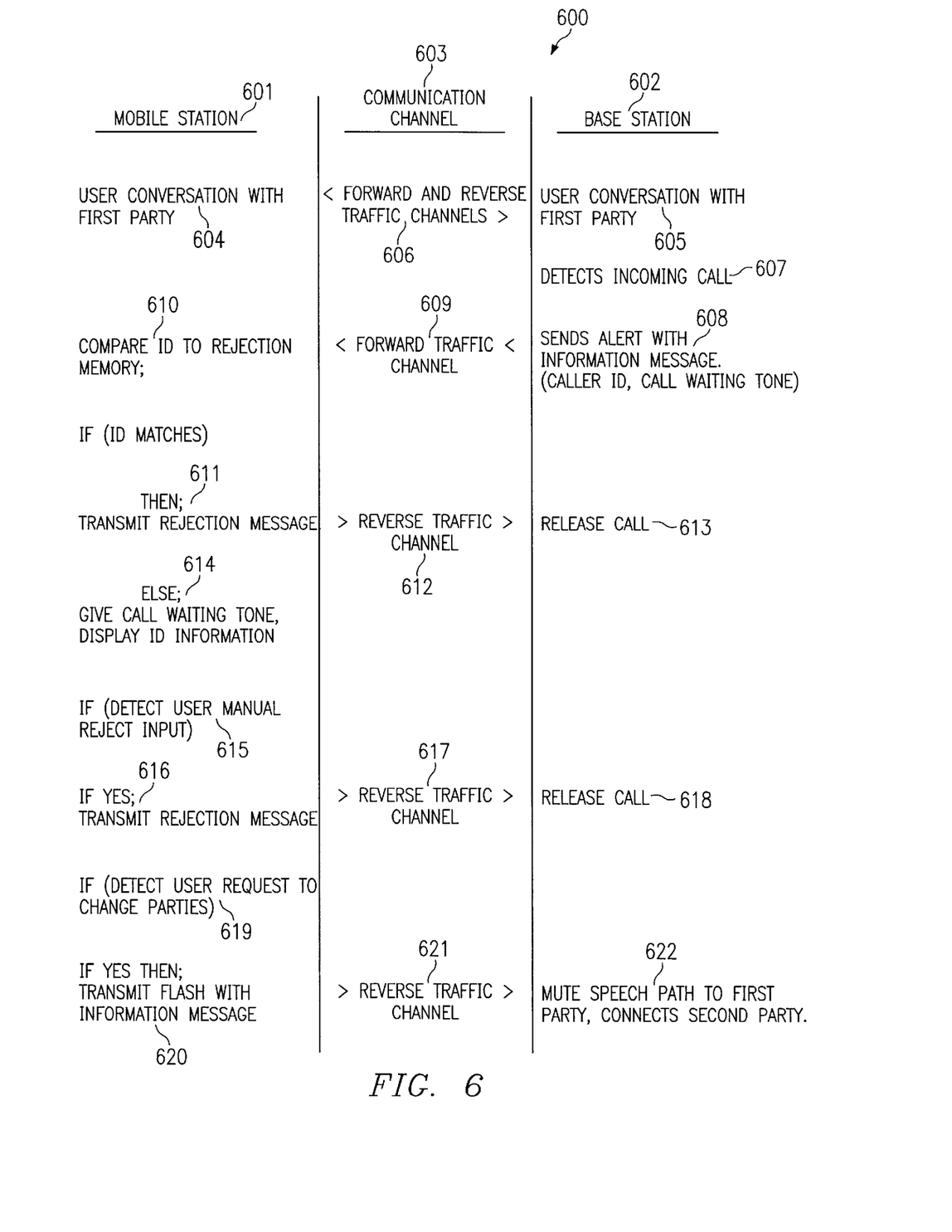
FIG. 6 depicts an exemplary message sequence for rejecting an incoming call according to the teachings of the present invention, wherein the mobile communications device, while currently processing an active call, may reject a subsequent incoming call.

Referring now to FIG. 6, therein is depicted messaging sequence 600 which can be used to implement an embodiment of the present invention as depicted in FIG. 4. Messaging sequence 600 can be used in a telecommunications system operating in accordance with the IS-95 standard. It will be apparent to those skilled in the art that by substituting the corresponding protocol and processes, the disclosed call rejection invention may be similarly implemented using different message sequencing as found in other types of communications networks.

In the embodiment of FIG. 4, functional blocks 404, 408, 412, 418, 420, 422 and 424 require messages to be transmitted between the mobile phone and the base station to fulfill the specified tasks. These messages are sent via communication channel 124. The following description, which references FIGS. 4 and 6, defines the types of messages that are sent, where they originate and what portion of communication channel 124 they are transmitted on.

Referring again to FIG. 6, mobile station activities are shown at 601 and base station activities are shown at 602. The portion of communication channel 124 used for transmitting messages is shown at 603.

Mobile Phone on Current Call (Block 404)

When a calling party attempts to call the mobile phone, call processing is dependent on the current state of the mobile phone. In the embodiment of the invention as depicted in FIG. 4, the mobile phone is actively involved in a current conversation as shown at 404. The current conversation comprises information messages shown at 604 and 605, which are transmitted over the forward traffic channel 123 and the reverse traffic channel 121 as shown at 606.

Incoming Call (Block 406)

With the mobile phone actively involved in a first conversation as shown at block 404, an incoming call is received as shown at block 406. The incoming call is detected by the base station as shown at 607. The base station then sends an Alert with Information Message to the mobile phone as shown at 608. This message is sent over the forward traffic channel 123, as shown at 609, to alert the mobile there is an incoming call. The information message may contain caller ID information and can be used by the mobile phone to trigger an alert signal to notify the mobile phone user of the attempted incoming call if desired.

Phone Sends Rejection Message (Blocks 408, 410 and 412)

Upon receipt by the mobile phone of the Alert with Information Message 608, the mobile phone does not automatically alert the mobile phone user of the incoming call. First, the mobile phone may determine if the incoming call should be automatically rejected. The determination occurs when the mobile phone compares the caller ID information contained in the Information Message 608 to information stored in rejection memory 104 as shown in the call flow at 408 and in the message sequence at 610. If a match is detected, the mobile phone transmits a rejection message 611 to the base station over the reverse traffic channel 121 as shown at 612. The rejection message can be formatted as shown in FIGS. 3a and 3b, indicating to the base station that the attempted call is to be rejected. Upon receipt of the rejection message, the base station releases the call as shown at 613 and may transfer the caller to a voice messaging system as shown at block 416 or provide other call processing as desired.

Manual Rejection of the Incoming Call (Blocks 418, 420 and 422)

If the mobile phone fails to detect a match of the identification information as shown at 614, the mobile phone may alert the mobile phone user of the incoming call by activating an audible call waiting tone or a muted ring as shown at 418. During this time, the caller ID information may also be displayed to the mobile phone user on mobile phone display 110.

Once the mobile phone user is alerted of the incoming call, indicating that automatic rejection did not occur, a manual call rejection can be activated as shown at blocks 420 and 422. If the user decides to manually reject the call, a manual rejection input can be activated as shown in block 422. This manual rejection input is detected as shown at 615. When the manual rejection input is detected, the mobile phone transmits the rejection message 616 over the reverse traffic channel 121 as shown at 617. When the message is received by the base station, the call will be released as shown at 618.

Connecting the Call (block 424)

If the incoming call is not automatically or manually rejected, the user has the option to answer the incoming call. This option is provided at block 424. In this case, the user provides input indicating the incoming call is to be connected. In effect, a call-waiting feature is activated where a first call is placed on hold while a second call is connected. The user input is detected at 619 and results in a flash with information message 620 being transmitted to the base station via the reverse traffic channel 121 as shown at 621. The format of this message will not be discussed in detail as it does not pertain to the present invention. However, this message should comply with the applicable standard for implementing the call-waiting feature. When the base station receives this message, as shown at 622, the speech path of the first party is muted which has the effect of placing the first party on hold. In the meantime, the second party is connected to the mobile phone user, thereby allowing two-way conversation to occur.

Although described in the context of particular embodiments, it will be realized that a number of modifications to these teachings may occur to one skilled in the art. For example, the invention could be readily incorporated into various remote communication devices. Such devices may include, but are not limited to, roadside call boxes, portable computers having detachable cell phone adapters or Personal Assistants (PDA) with cellular link-up capabilities. Thus, while the invention has been particularly shown and described with respect to specific embodiments thereof, it will be understood by those skilled in the art that changes in form and shape may be made therein without departing from the scope and spirit of the invention.

What is claimed is:

1. A method of selectably rejecting an incoming call to a mobile phone, said mobile phone having a transceiver circuit for transmitting and receiving transmissions to and from a remote transceiver on a communication channel in a wireless system, said method comprising the steps of:

receiving at the mobile phone a transmission from the remote transceiver signifying that there is an incoming call;

determining at the mobile phone if said incoming call is to be rejected; and transmitting from the mobile phone a rejection message to the remote transceiver, in response to a determination being made, during said step of determining, that said incoming call is to be rejected, said rejection message comprising at least one information element indicating to the wireless system that the wireless system is to immediately release the incoming call on the communication channel between the mobile phone and remote transceiver.

2. The method of claim 1, wherein the mobile phone further comprises an actuator operable by a user for inputting a first input, said step of determining comprising the steps of:

notifying the user of said transmission; and receiving a first input from the actuator, wherein reception of the first input indicates that said incoming call is to be rejected.

3. The method of claim 1, wherein the mobile communications device includes a memory and said transmission includes a first parameter, said step of determining comprising the steps of:

storing a second parameter in the memory;

comparing at least a portion of the first parameter with said second parameter; and determining whether at least a portion of the first parameter matches said second parameter, wherein if a match occurs, said incoming call is to be rejected.

4. The method of claim 3, wherein the step of transmitting further comprises the step of notifying the user of said incoming call to be rejected.

5. A method of rejecting an incoming call to a mobile phone, said mobile phone having a transceiver circuit for transmitting and receiving transmissions to and from a remote transceiver, said mobile phone in communication with a first calling station via the remote transceiver on a communication channel in a wireless system, said method comprising the steps of:

receiving at the mobile phone, a transmission from the remote transceiver signifying that there is an incoming call;

determining at the mobile phone if said incoming call is to be rejected; and transmitting from the mobile phone a rejection message to the remote transceiver in response to a determination being made, during said step of determining, that said incoming call is to be rejected, said rejection message comprising at least one information element indicating to the wireless system that the wireless system is to immediately release the incoming call on the communication channel between the mobile phone and remote transceiver.

6. The method of claim 5, wherein the mobile phone includes an actuator operable by a user for inputting a manual input to the mobile phone, said step of determining comprises the step of:

notifying the user of said incoming call; and receiving a manual input from the actuator, wherein reception of said manual input indicates that said incoming call is to be rejected.

7. The method of claim 5, wherein the mobile phone further comprises a memory and said transmission includes a first parameter, said operation of determining comprising the steps of:

storing a second parameter in the memory;

comparing at least a portion of the first parameter with said second parameter; and determining whether at least a portion of the first parameter matches said second parameter, wherein if a match occurs, said incoming call is to be rejected.

8. The method of claim 7, wherein the step of transmitting comprises the step of actuating manual transmission of a rejection message to the remote transceiver if a determination is made during said step of determining that said incoming call is to be rejected.

9. The method of claim 7, wherein the operation of transmitting further comprises notifying the user of said incoming call to be rejected.

10. In a mobile communications device, apparatus for selectably rejecting an incoming call, said apparatus comprising:

a transceiver operable to send and receive transmissions to and from a remote transceiver in a wireless system on a communication channel, said transceiver for receiving a transmission signifying that an incoming call is being attempted; and a control processor coupled to said transceiver, said control processor for determining if said incoming call is to be rejected, and, in response to a positive determination, said control processor for outputting a rejection message to said transceiver for transmission to said remote transceiver, wherein said rejection message comprises at least one information element indicating to the wireless system that the wireless system is to immediately release the incoming call on the communication channel between the mobile communications device and remote transceiver.

11. The apparatus of claim 10, wherein said control processor comprises:

a user notification means;

an actuator for inputting a manual input from the user; and a message processor coupled to said user notification means, said actuator and said transceiver, said message processor for detecting said transmission, wherein when said transmission is detected, said message processor activates said user notification means, wherein upon detecting a manual input from said actuator, said message processor outputs a rejection message to said transceiver for transmission to said remote transceiver.

12. The apparatus of claim 10, wherein said transmission includes a first parameter, said control processor comprises:

a memory for storing a second parameter;

a determiner coupled to said memory and said transceiver, said determiner for comparing at least a portion of the first parameter with said second parameter, wherein if at least a portion of the first parameter matches said second parameter, said determiner outputs a rejection message to said transceiver for transmission to said remote transceiver.

13. A method of selectably terminating a transmission transmitted from a base station in a wireless system, said base station having a transceiver circuit for transmitting and receiving transmissions to and from at least a first remote station and a second remote station on a communication channel, said method comprising the steps of:

receiving at the base station a first transmission from the first remote station;

transmitting from the base station, in response to receiving said first transmission, a second transmission to the second remote station, said second transmission indicating an incoming call to the second remote station from the first remote station;

receiving at the base station a third transmission from the second remote station, said third transmission having a parameter;

detecting at the base station if said parameter has at least one information element indicating that said second transmission is rejected at said second remote station and is to be terminated; and terminating immediately at the base station said second transmission on the communication channel between said base station and second remote station, if it is determined during said step of detecting that said second transmission is to be terminated.

14. The method of claim 13, wherein the base station further comprises a message controller, said operation of terminating further comprising the step of transferring control of said first transmission to the message controller if it is determined at said step of detecting that said second transmission is to be terminated.

15. A method for selectably rejecting a transmission in a cellular communications system, said cellular communications system having a base station capable of two-way communication over a radio communication channel with a remote station, said method comprising the steps of:

transmitting a first transmission from the base station to the remote station;

determining at the remote station if said first transmission is to be rejected;

transmitting a rejection message from the remote station to the base station if it is determined at said step of determining that said first transmission is to be rejected;

receiving said rejection message at the base station;

detecting whether said rejection messages has at least one information element indicating that said first transmission is to be terminated; and terminating immediately at the base station said first transmission to the remote station on the communication channel between said base station and the remote station if it is determined at said step of detecting that said first transmission is to be terminated.

* * * * *

//

(12) EX PARTE REEXAMINATION CERTIFICATE (8908th)
United States Patent
Beghtol et al.

(10) Number: US 6,253,075 C1
(45) Certificate Issued: Mar. 20, 2012

(54) METHOD AND APPARATUS FOR INCOMING CALL REJECTION (75) Inventors: Justin Beghtol, San Diego, CA (US); Kenneth Mar, San Diego, CA (US)

(73) Assignee: Mobilemedia Ideas LLC, Chevy Chase, MD (US)

Reexamination Request:
No. 90/011,436, Jan. 14, 2011
No. 90/011,650, Apr. 19, 2011

Reexamination Certificate for:
Patent No.: 6,253,075
Issued: Jun. 26, 2001
Appl. No.: 09/212,757
Filed: Dec. 16, 1998

Related U.S. Application Data

(60) Provisional application No. 60/086,032, filed on May 19, 1998.

(51) Int. Cl.
*H04M 1/66* (2006.01)
*H04M 1/663* (2006.01)
*H04M 1/57* (2006.01)
*H04Q 7/38* (2006.01)
*H04Q 7/32* (2006.01)

(52) U.S. Cl. .................. 455/415; 455/412; 455/567; 379/142

(58) Field of Classification Search ............... None
See application file for complete search history.

(56) References Cited

To view the complete listing of prior art documents cited during the proceedings for Reexamination Control Numbers 90/011,436 and 90/011,650, please refer to the USPTO's public Patent Application Information Retrieval (PAIR) system under the Display References tab.

*Primary Examiner* — Scott L. Weaver (57) ABSTRACT

A method and apparatus for rejecting incoming calls for use in a mobile communications device. The method and apparatus permit a user of a mobile communications device to automatically reject calls intended to be received by the device. In an exemplary embodiment, a rejection memory within the mobile device is preprogrammed with identification information representative of transmitting stations to be rejected. When a call is incoming, identification information included with the incoming call is compared with identification information contained in the rejection memory. When a match is detected, a rejection message is automatically sent by the mobile communications device to the transmitting station. Upon receipt of the rejection message, the transmitting station terminates the call and may reroute the call to a voice messaging system. Additionally, upon display of the identification information of an incoming call, the user may manually trigger the transmission of the rejection message from the mobile communications device.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5-9 is confirmed.

Claims 1-4 are cancelled.

Claims 10, 13 and 15 are determined to be patentable as amended.

Claims 11-12 and 14 dependent on an amended claim, are determined to be patentable.

10. In a mobile communications device, apparatus *in communication with a first calling station* for selectably rejecting an incoming call, said apparatus comprising:
 a transceiver operable to send and receive transmissions to and from a remote transceiver in a wireless system on a communication channel, said transceiver for receiving a transmission signifying that an incoming call is being attempted; and
 a control processor coupled to said transceiver, said control processor for determining if said incoming call is to be rejected, and, in response to a positive determination, said control processor for outputting a rejection message to said transceiver for transmission to said remote transceiver, wherein said rejection message comprises at least one information element indicating to the wireless system that the wireless system is to immediately release the incoming call on the communication channel between the mobile communications device and remote transceiver.

13. A method of selectably terminating a transmission transmitted from a base station in a wireless system, said base station having a transceiver circuit for transmitting and receiving transmissions to and from at least a first remote station and a second remote station, *in communication with a first calling station,* on a communication channel, said method comprising the steps of:
 receiving at the base station a first transmission from the first remote station;
 transmitting from the base station, in response to receiving said first transmission, a second transmission to the second remote station, said second transmission indicating an incoming call to the second remote station from the first remote station;
 receiving at the base station a third transmission from the second remote station, said third transmission having a parameter;
 detecting at the base station if said parameter has at least one information element indicating that said second transmission is rejected at said second remote station and is to be terminated; and
 terminating immediately at the base station said second transmission on the communication channel between said base station and second remote station, if it is determined during said step of detecting that said second transmission is to be terminated.

15. A method for selectably rejecting a transmission in a cellular communication system, said cellular communications system having a base station capable of two-way communication over a radio communication channel with a remote station *in communication with a first calling station,* said method comprising the steps of:
 transmitting a first transmission from the base station to the remote station;
 determining at the remote station if said first transmission is to be rejected;
 transmitting a rejection message from the remote station to the base station if it is determined at said step of determining that said first transmission is to be rejected;
 receiving said rejection message at the base station;
 detecting whether said rejection messages has at least one information element indicating that said first transmission is to be terminated; and
 terminating immediately at the base station said first transmission to the remote station on the communication channel between said base station and the remote station if it is determined at said step of detecting that said first transmission is to be terminated.

* * * * *

(12) EX PARTE REEXAMINATION CERTIFICATE (10809th)
United States Patent
Beghtol et al.

(10) Number: US 6,253,075 C2
(45) Certificate Issued: Feb. 4, 2016

(54) METHOD AND APPARATUS FOR INCOMING CALL REJECTION

(75) Inventors: Justin Beghtol, San Diego, CA (US); Kenneth Mar, San Diego, CA (US)

(73) Assignee: MOBILEMEDIA IDEAS LLC, Chevy Chase, MD (US)

Reexamination Request:
No. 90/012,638, Sep. 14, 2012

Reexamination Certificate for:
Patent No.: 6,253,075
Issued: Jun. 26, 2001
Appl. No.: 09/212,757
Filed: Dec. 16, 1998

Reexamination Certificate C1 6,253,075 issued Mar. 20, 2012

Related U.S. Application Data

(60) Provisional application No. 60/086,032, filed on May 19, 1998.

(51) Int. Cl.
| | |
|---|---|
| *H04M 1/66* | (2006.01) |
| *H04M 1/663* | (2006.01) |
| *H04Q 7/38* | (2006.01) |
| *H04M 1/57* | (2006.01) |
| *H04Q 7/32* | (2006.01) |
| *H04W 4/20* | (2009.01) |

(52) U.S. Cl.
CPC .............. *H04W 4/20* (2013.01); *H04M 1/663* (2013.01); *H04M 1/57* (2013.01)

(58) Field of Classification Search
None
See application file for complete search history.

(56) References Cited

To view the complete listing of prior art documents cited during the proceeding for Reexamination Control Number 90/012,638, please refer to the USPTO's public Patent Application Information Retrieval (PAIR) system under the Display References tab.

*Primary Examiner* — Majid Banankhah (57) ABSTRACT

A method and apparatus for rejecting incoming calls for use in a mobile communications device. The method and apparatus permit a user of a mobile communications device to automatically reject calls intended to be received by the device. In an exemplary embodiment, a rejection memory within the mobile device is preprogrammed with identification information representative of transmitting stations to be rejected. When a call is incoming, identification information included with the incoming call is compared with identification information contained in the rejection memory. When a match is detected, a rejection message is automatically sent by the mobile communications device to the transmitting station. Upon receipt of the rejection message, the transmitting station terminates the call and may reroute the call to a voice messaging system. Additionally, upon display of the identification information of an incoming call, the user may manually trigger the transmission of the rejection message from the mobile communications device.

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-4 were previously cancelled.
Claims 5, 6, 10 and 11 are cancelled.
Claims 7-9 and 12-15 were not reexamined.

\* \* \* \* \*